United States Patent
Bhatia et al.

(10) Patent No.: US 9,395,985 B2
(45) Date of Patent: Jul. 19, 2016

(54) EFFICIENT CENTRAL PROCESSING UNIT (CPU) RETURN ADDRESS AND INSTRUCTION CACHE

(71) Applicant: TEXAS INSTRUMENTS DEUTSCHLAND GMBH, Freising (DE)

(72) Inventors: Shrey Bhatia, Freising (DE); Christian Wiencke, Garching (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 384 days.

(21) Appl. No.: 14/160,280

(22) Filed: Jan. 21, 2014

(65) Prior Publication Data
US 2015/0205613 A1    Jul. 23, 2015

(51) Int. Cl.
  *G06F 9/00*   (2006.01)
  *G06F 9/30*   (2006.01)
  *G06F 9/38*   (2006.01)
(52) U.S. Cl.
  CPC .......... *G06F 9/30054* (2013.01); *G06F 9/3804* (2013.01); *G06F 9/3814* (2013.01)
(58) Field of Classification Search
  CPC ............................ G06F 9/3804; G06F 9/3814
  See application file for complete search history.

(56) References Cited

U.S. PATENT DOCUMENTS

2004/0073749 A1* 4/2004 Parthasarathy ..... G06F 9/30181
                                                     711/128
2008/0184010 A1* 7/2008 Uchiyama ............ G06F 9/3814
                                                     712/207

* cited by examiner

*Primary Examiner* — Zachary K Huson
(74) *Attorney, Agent, or Firm* — John R. Pessetto; Frank D. Cimino (57) ABSTRACT

A processor includes an instruction fetch unit and an instruction decode unit. The instruction fetch unit includes an instruction pre-fetch buffer and is configured to fetch instructions from memory into the instruction pre-fetch buffer. The instruction decode unit is coupled to the instruction pre-fetch buffer and upon decoding a call instruction from the instruction pre-fetch buffer, causes next N instruction words of the instruction pre-fetch buffer to be preserved for execution after completing execution of a software module indicated by the call instruction, and causes the instruction fetch unit to begin fetching instructions of the software module from the memory at an address indicated by the call instruction. Upon completion of execution of the software module, the instruction decode unit begins to decode the preserved N instruction words while the instruction fetch unit concurrently fetches instruction words from beginning at an address after the N instruction words.

20 Claims, 5 Drawing Sheets

EFFICIENT CENTRAL PROCESSING UNIT (CPU) RETURN ADDRESS AND INSTRUCTION CACHE

CROSS-REFERENCE TO RELATED APPLICATION

None.

BACKGROUND

A central processing unit (CPU) may be the hardware within an electronic computing device (e.g., a computer) that carries out instructions of a computer program. A CPU may comprise a control unit (CU) and an arithmetic logic unit (ALU). The control unit may manage and control CPU activities, such as fetching instructions of a computer program from memory, decoding the instructions, and executing the instructions. In addition, the ALU may perform arithmetical and/or logical operations according to the decoded instructions. A CPU may repeat the instruction fetch, decode, and execute cycle until the computer program instructs the CPU to stop.

SUMMARY

A processor comprising an internal return address and instruction cache is disclosed herein. In one embodiment, a processor includes an instruction fetch unit and an instruction decode unit. The instruction fetch unit includes an instruction pre-fetch buffer and is configured to fetch instructions from memory into the instruction pre-fetch buffer. The instruction decode unit is coupled to the instruction pre-fetch buffer and upon decoding a call instruction from the instruction pre-fetch buffer, causes next N instruction words of the instruction pre-fetch buffer to be preserved for execution after completing execution of a software module indicated by the call instruction, and causes the instruction fetch unit to begin fetching instructions of the software module from the memory at an address indicated by the call instruction. Upon completion of execution of the software module, the instruction decode unit begins to decode the preserved N instruction words while the instruction fetch unit concurrently fetches instruction words from beginning at an address after the N instruction words.

In another embodiment, a method includes fetching a plurality of instructions from memory into an instruction pre-fetch buffer. Upon decoding a first call instruction from the instruction pre-fetch buffer to execute a first software module, the next N instruction words of the instruction pre-fetch buffer are preserved through at least completed execution of the first software module, where N is greater than or equal to one. Upon completion of the first software module, the decoding and execution of the preserved N instruction words are performed concurrently with the fetching of instruction words from the memory beginning at an address immediately after the N instruction words.

In yet another embodiment, a process includes an instruction fetch unit, an instruction decode unit, and an instruction execution unit. The instruction fetch unit includes a return instruction cache, a pre-decoder unit, and an instruction pre-fetch buffer. The instruction fetch unit is configured to fetch instructions from memory into the instruction pre-fetch buffer. The pre-decoder unit is coupled to the instruction pre-fetch buffer and the return instruction cache, and upon decoding a call instruction from the instruction pre-fetch buffer, causes next N instruction words to be saved into the return instruction cache, and causes the instruction fetch unit to begin fetching instructions of the software module from the memory at an address indicated by the call instruction, where N is an integer value greater than or equal to one. The decode unit is coupled to the instruction pre-fetch buffer and the return instruction cache and configured to decode the fetched instructions. The instruction execution unit is coupled to the instruction decode unit and configured to execute the decoded instructions. Upon completion of execution of the software module, the instruction decode unit begins to decode the saved N instruction words in the return instruction cache while the instruction fetch unit concurrently fetches instructions from the memory beginning at an address after the N instruction words.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some CPU architectures, instructions of a computer program may be represented and/or encoded in some CPU-dependent machine instruction codes and may be stored in memory. As such, the execution of a computer program may include fetching instructions from memory, decoding, and executing the instructions. For example, a CPU may comprise an instruction fetch unit, a decode unit, and an execution unit, which may fetch instructions from memory, decode the instructions into operations (e.g. arithmetical and/or logical operations), and carry out the operations, respectively. A CPU may continue to fetch, decode, and execute instructions of a computer program until the computer program instructs the CPU to stop. In some embodiments, a CPU may employ a pipelined architecture to increase instruction throughput by allowing multiple instruct ions to overlap in execution. In such CPU architectures, the processing of each instruction may be segmented into multiple dependent phases (e.g. a fetch phase, a decode phase, and an execution phase) and the CPU may concurrently operate on multiple consecutive instructions. For example, a CPU may execute a first instruction, decode a second instruction, and fetch a third instruction at one time (e.g. in a CPU cycle). A CPU may employ an instruction fetch unit comprising an instruction pre-fetch buffer for storing an instruction fetched in a CPU cycle, where the instruction may be decoded by the decode unit in a next CPU cycle. In some other CPU architectures, each of the fetch, decode, and execution phases may be divided further depending on the number of pipeline stages and may have additional stages for data read and/or write.

In some computer programs, a main program may call a plurality of sub-routines and/or service interrupt events. As such, the CPU may execute the main program at one memory location, jump to another non-consecutive memory location to execute a different instruction sequence for a sub-routine or an interrupt service routine (ISR), and jump back or return to execute the main program after completing the execution of the sub-routine or the ISR. In a pipelined CPU, instructions may be pre-fetched from memory in sequential order. However, when a calling operation occurs, the pre-fetched instructions may not be applied as the calling operation may divert the execution to the sub-routine or the ISR at a different memory location. The pre-fetched instructions may be discarded during the execution of the sub-routine or the ISR and re-fetched from memory when returning from the sub-routine or the ISR. As such, a calling operation may cause discontinuity in CPU processing and may lower CPU performance. It should be noted that a calling operation may refer to a call instruction that causes a call to a sub-routine and may be an absolute call, a relative call, or a table call, or may refer to a servicing of an interrupt event. The present disclosure may employ the term "call instruction" to refer to a calling operation and may employ the term "call instruction" loosely to include a servicing of interrupt event.

Embodiments of the CPU disclosed herein include an instruction fetch unit that comprises an instruction pre-fetch buffer and an internal cache for return address and return instructions. When a call instruction to a sub-routine or an ISR is decoded, the instruction fetch unit may save a return address (e.g. address of the memory location after the call instruction) in the internal cache. In addition, the instruction fetch unit may preserve the already fetched N instruction words (e.g. next N instruction words following the call instruction), where N may be about four words (e.g., 3-5) in some CPU architectures and the N instruction words may represent at least one instruction. In one embodiment, the N pre-fetched instruction words may be preserved by copying the N instruction words into the internal cache or alternatively into a reserved portion of the instruction pre-fetch buffer. In another embodiment, the N pre-fetched instruction words may be preserved at the current position of the instruction pre-fetch buffer. For example, the portion of the instruction pre-fetch buffer where the N instruction words are stored may be excluded from normal fetch operations during the execution of the sub-routine. When execution of the sub-routine or the ISR is completed, the N preserved instruction words may be read from the internal cache for further processing without re-fetching from memory. In some embodiments, the internal cache may reuse a portion of the instruction pre-fetch buffer. In some other embodiments, the internal cache may be a separate cache located internal to the instruction fetch unit. The disclosed embodiments may reduce CPU processing discontinuity penalty from a sub-routine return or an ISR return to about zero cycles. As a result, CPU performance may be improved. In addition, memory accesses may be reduced, thus lowering system energy and/or power consumption.

Figure 1:
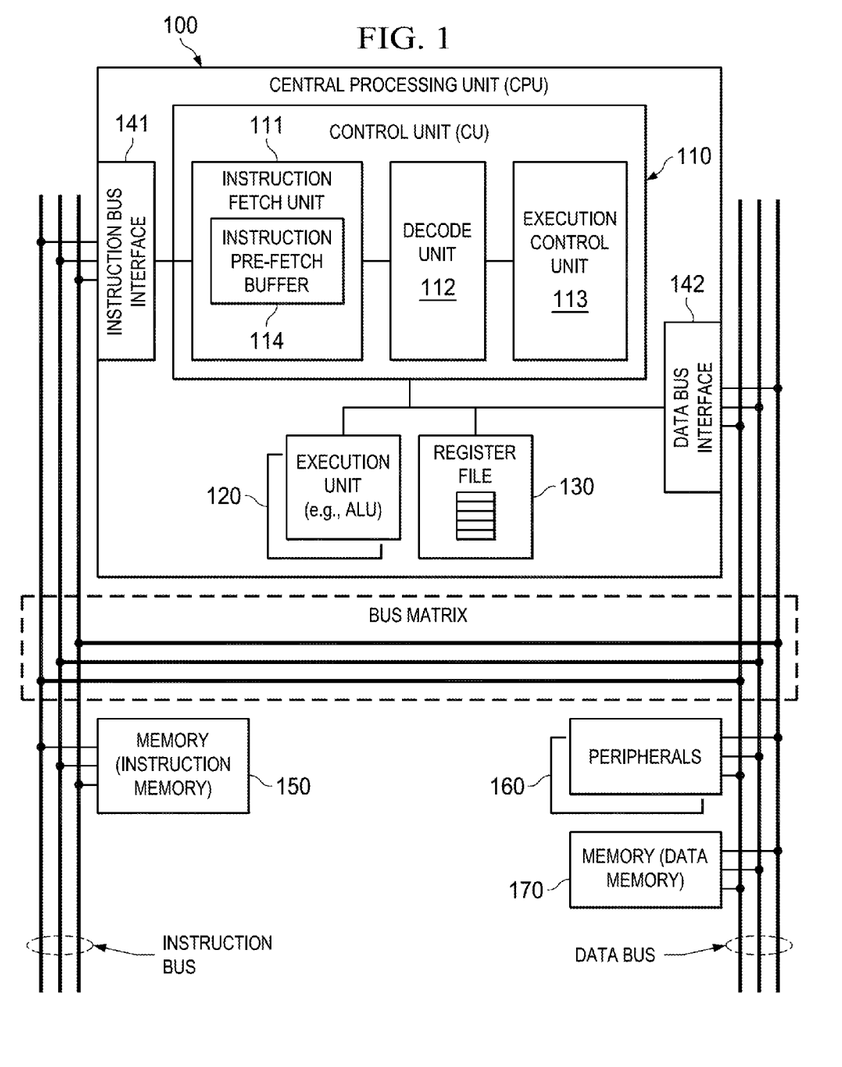
FIG. 1 shows a block diagram of a CPU in accordance with various embodiments.

FIG. 1 shows a block diagram of a CPU 100 in accordance with various embodiments. The CPU 100 may comprise a CU 110, a plurality of execution units 120, a register file 130, an instruction bus interface 141, and a data bus interface 142. The CU 110, the execution units 120, and the register file 130 may be coupled via a plurality of signal connections (e.g. data signal, control signal). CPU 100 may be coupled to external components and/or sub-systems via a system bus or a bus matrix (e.g. control, data, address). For example, CU 110 may be coupled to an instruction memory 150 via the instruction bus interface 141 and to a data memory 170 and a plurality of peripherals 160 via the data bus interface 142. The instruction memory 150 may be any memory storage (e.g. random access memory (RAM) and/or read only memory (ROM)) configured to store program instructions. The data memory 170 may be any memory storage configured to store data. The peripherals 160 may be any device and/or components connected to CPU 100. It should be noted that some CPUs (e.g. a Von-Neumann architecture) may comprise one bus interface for both data and instructions while some other CPUs (e.g. a Harvard architecture) may comprise separate bus interface for data and instructions.

The execution units 120 may comprise an ALU, an address calculation unit, a multiplier, a divider, a floating point unit, etc. The execution units 120 may be configured to perform computing functions, such as arithmetic (e.g. addition, subtraction, multiplication, and/or division) and/or logical (e.g. AND, OR, XOR, bit shifting) operations.

The register file 130 may be a small internal memory (e.g. 10-20 words) for quick storages and retrievals of data and instructions. Some examples of CPU registers may include a program counter (PC), a stack pointer (SP), control registers, and/or general purpose registers. For example, a PC may hold an address of a program instruction in instruction memory 150 to be executed, a SP may hold an address of a scratch area in data memory 170 for temporary storage, control registers may hold controls for CPU behavior (e.g. interrupts enable and/or disable), and general purpose registers may hold general data and/or addresses for carrying out instructions of a computer program.

The CU 110 may comprise an instruction fetch unit 111, a decode unit 112, and an execution control unit 113. In some embodiments, CU 110 may further comprise other control logic circuits and/or a clock. The CU 110 may coordinate and manage CPU activities, in particular, execution of instructions by the execution units 120. CPU activities may be synchronized to the clock, where a clock period may be referred to as a CPU cycle. In some embodiments, instructions of a computer program may be encoded in CPU-dependent machine instruction codes and stored in instruction memory 150. As such, the execution of a program may include fetching instructions from instruction memory 150, decoding the instructions into CPU operations, and executing the operations. In addition, data read (e.g. operand to be operated on) and/or data write (e.g. computed result to be stored) from and/or to data memory 170 may be performed. It should be noted that an instruction may be encoded into one or more instruction words, where the size of an instruction word (e.g. 8-bits, 16-bits, 32-bits, etc.) may vary across embodiments of CPU architectures.

The instruction fetch unit 111 may comprise logic circuits configured to fetch instructions of a computer program from memory. The instructions of a computer program may be stored sequentially in consecutive locations in instruction memory 150. As such, the instruction fetch unit 111 may fetch instructions sequentially from instruction memory 150 and may track memory fetch addresses by employing a PC, which may be incremented sequentially as the fetching proceeds. In some embodiments, the instruction fetch unit 111 may further comprise an instruction pre-fetch buffer 114 (e.g. in a pipelined CPU). The instruction pre-fetch buffer 114 may enable the instruction fetch unit 111 to continuously provide previously fetched instructions to the decode unit 112 without stalling (e.g. waiting for the instruction bus or the instruction memory 150 which might be occupied). It should be noted that the pre-fetching of instructions may improve instructions throughput (e.g. execution of one instruction per CPU cycle), but may not reduce the time (e.g. number of CPU cycles) to complete an instruction.

The decode unit 112 may be coupled to the instruction fetch unit 111 and may comprise logic circuits configured to decode CPU-dependent machine instruction codes stored in the instruction pre-fetch buffer 114 into CPU operations. For example, a CPU-dependent machine instruction code may comprise an operation code (e.g. add, subtract, etc.), an operand (e.g. data to be operated on), and/or addressing information (e.g. memory address computation for read and/or write). The execution control unit 113 may be coupled to the decode unit 112 and may comprise logic circuits configured to execute the decoded instructions.

CPU 100 may perform the cycle of instruction fetch, decode, and execute continuously once CPU 100 is powered up and/or when a program is started until CPU 100 is powered off and/or when the program is completed. A program may comprise a plurality of software modules, such as a main program and a plurality of sub-routines. For example, a main program may be stored sequentially in a block of consecutive memory locations in instruction memory 150 and each sub-routine may be stored in other blocks of consecutive memory locations in instruction memory 150. As such, when executing a program, the instruction fetch unit 111 may fetch instructions sequentially from the main program memory block and may branch to a sub-routine memory block upon a call instruction to a sub-routine. In addition, CPU 100 may respond to interrupt events, where CPU 100 may service an interrupt by executing an ISR, which may be stored in yet another block of consecutive memory locations in instruction memory 150. It should be noted that the main program, sub-routines, and ISRs may or may not be stored in a same physical block of memory, for example, instruction memory 150 may comprise a plurality of physical memory blocks.

Figure 2:
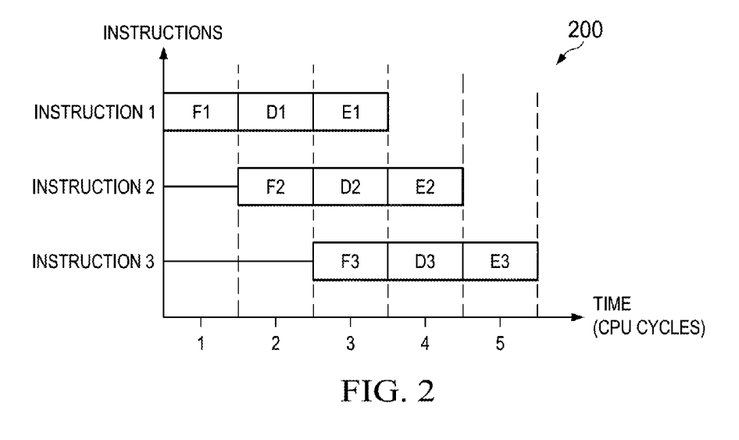
FIG. 2 shows a timing diagram of a pipelined CPU in accordance with various embodiments.

FIG. 2 shows a timing diagram 200 of a pipelined CPU in accordance with various embodiments. The timing diagram 200 may illustrate an example of a CPU, such as CPU 100, with three pipeline stages, a fetch stage, a decode stage, and an execution stage. It should be noted that in some embodiments, each stage may be further divided into multiple stages and may require additional operation phases, such as data read from memory and/or write to memory. In FIG. 2, the x-axis may represent time in units of CPU cycles and the y-axis may represent instructions. In the example of timing diagram 200, the CPU may fetch (e.g. F1), decode (e.g. D1), and execute (e.g. E1) instruction one in CPU cycles one, two, and three, respectively. The CPU may fetch (e.g. F2), decode (e.g. D2), and execute (e.g. E2) instruction two in CPU cycles two, three, and four, respectively. The CPU may fetch (e.g. F3), decode (e.g. D3), and execute (e.g. E3) instruction three in CPU cycles three, four, and five, respectively. As shown in the timing diagram 200, the CPU may concurrently fetch instruction three, decode instruction two, and execute instruction one in CPU cycle 3. The overlapping operations may continue as the CPU proceeds to process successive instructions. As such, by dividing the processing of an instruction into multiple steps and performing overlapping operations may increase instruction throughput. However, a pipelined architecture may result in a discontinuity penalty when executing a call instruction to a sub-routine or an ISR. For example, during the decoding of a call instruction, the CPU pipeline may continue to fetch instructions sequentially, but the fetched instruction may not apply as the call instruction may divert the execution of a program to the sub-routine or an ISR. For example, in timing diagram 200, if instruction two is a call instruction to a sub-routine, the next instruction to be fetched may be the first instruction of the sub-routine instead of the already fetched instruction three. Thus, the CPU pipeline may be flushed and/or discontinued and may reduce CPU performance. In addition, the discarding of the pre-fetched instruction words and the re-fetching of the discarded instruction words may cause energy wastage.

Figure 3:
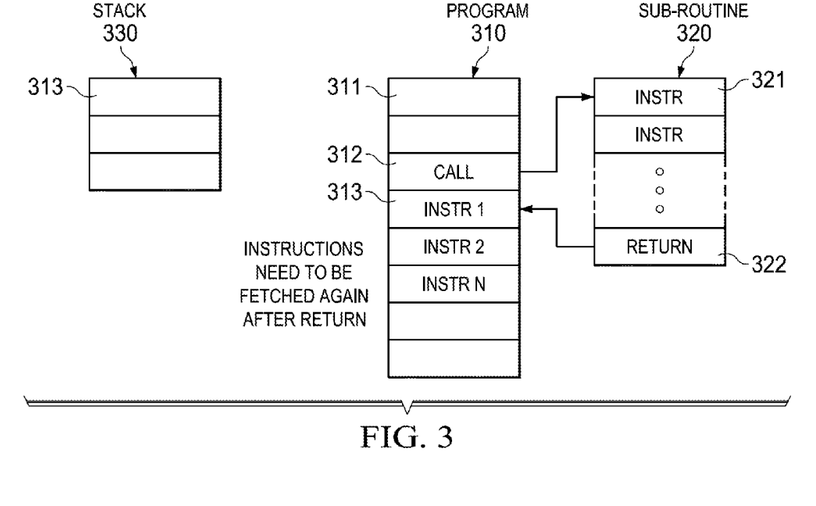
FIG. 3 shows execution of a program comprising a sub-routine call in accordance with various embodiments.

FIG. 3 shows an execution of a program comprising a sub-routine call in accordance with various embodiments. In FIG. 3, a program 310 may be stored in memory, such as instruction memory 150, starting at memory address 311 and a sub-routine 320 may be stored in memory starting at memory address 321. The program 310 may comprise a CALL instruction at memory address 312 to branch to sub-routine 320. The program 310 may be executed by a pipelined CPU, which may be substantially similar to CPU 100. When the CPU decodes the CALL instruction, the next N instruction words (e.g. INSTR 1, INSTR2, . . . , INSTR N) following the CALL instruction (e.g. starting at memory address 313) may already be fetched and stored in an instruction pre-fetch buffer (e.g. instruction pre-fetch buffer 114). Upon decoding of the CALL instruction, the CPU may save the address 313 (e.g. a return address after completing execution of the sub-routine 320) on a stack 330 (e.g. a scratched memory space) and discard the N fetched instruction words in the instruction pre-fetch buffer (e.g. instruction pre-fetch buffer 114) as the N fetched instruction words may not take effect until sub-routine 320 is completed. After saving the return address 313 on the stack, the CPU may proceed to fetch, decode, and execute sub-routine 320 until sub-routine 320 is completed at address 322. Upon completing the execution of the sub-routine 320, the CPU may fetch the return address 313 from the stack, re-fetch the discarded N instruction words following the call instruction from the memory, and return to execute program 310. As such, a branching operation in a pipelined CPU may introduce a discontinuity penalty and increase system energy consumption due to the additional CPU processing, instruction bus accesses, and/or memory accesses.

In an alternative embodiment, when a call instruction is decoded, a CPU (e.g. CPU 100) may employ a local return address register to store the return address 313. Thus, upon completing the execution of the sub-routine, the CPU may read the return address 313 from the return address register instead of fetching from the stack. In this embodiment, CPU performance penalty from discontinuity may be reduced, for example, to about two CPU cycles depending on the CPU bus architecture and/or the number of fetch pipeline stages. In addition, energy penalty from discontinuity may be reduced since the fetching of the return address 313 from the stack 330 may not be required. However, the energy penalty from the re-fetching of the discarded instruction words may remain. It should be noted that substantially similar mechanisms may be applied to an ISR call to save an interrupt return address on a stack and/or to a return address register.

Figure 4:
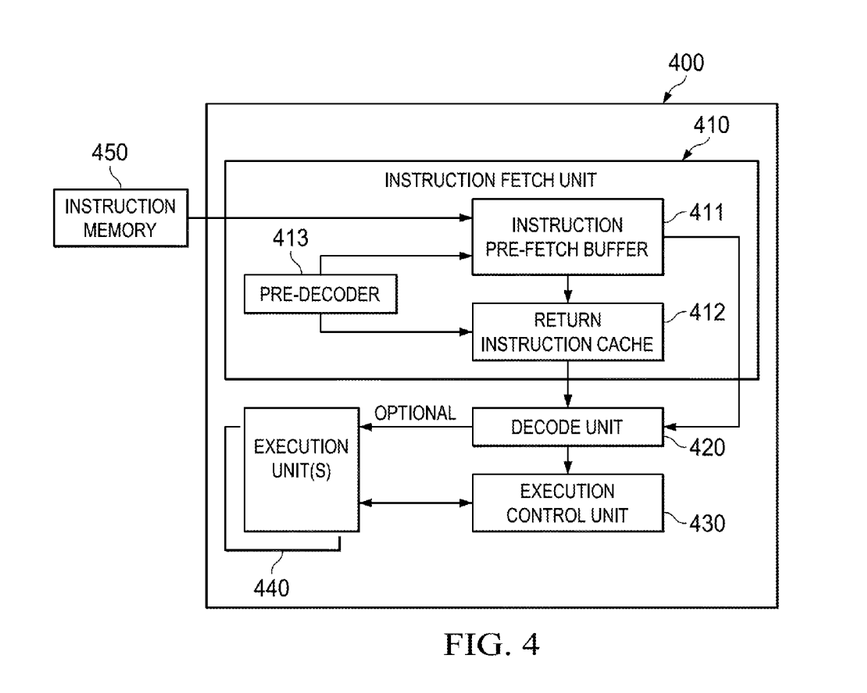
FIG. 4 shows a block diagram of a CPU comprising a return instruction cache in accordance with various embodiments.

FIG. 4 shows a block diagram of a CPU 400 comprising a return instruction cache in accordance with various embodiments. The CPU 400 may comprise an instruction fetch unit 410, a decode unit 420, an execution control unit 430, and a plurality of execution units (e.g. ALU) 440. The execution units 440 may be coupled to the decode unit 420 and execution control unit 430 and may be configured to perform substantially similar computing functions as execution units 120. CPU 400 may be coupled to an instruction memory 450 via a bus interface. The instruction memory 450 may be any memory storage (e.g. RAM, ROM, and/or cache) configured to store program instructions. The instruction fetch unit 410 may comprise an instruction pre-fetch buffer 411, a return instruction cache 412, a pre-decoder 413, and/or other logic circuits. The instruction fetch unit 410 may be configured to fetch instruction words from the instruction memory 450. The decode unit 420 may be coupled to the instruction pre-fetch buffer 411 and may comprise logic circuits configured to decode the fetched instructions in the instruction pre-fetch buffer 411. In addition, the decode unit 420 may be further coupled to the return instruction cache 412 and may be configured to decode instructions stored in the return instruction cache 412. The instructions may be encoded in a CPU-dependent machine format. The decode unit 420 may translate the machine codes into CPU operations. The execution control unit 430 may be coupled to the decode unit 420 and may comprise logic circuits configured to execute the decoded CPU operations. CPU 400 may employ a pipelining mechanism to divide execution of instructions into multiple stages, such as fetch, decode, and execute. As such, CPU 400 may operate on multiple instructions concurrently in a substantially similar mechanism as described in timing diagram 200.

The instruction pre-fetch buffer 411 may comprise a small amount of memory internal to instruction fetch unit 410 (although no limit is placed on the amount of memory) for storing instruction words pre-fetched from the instruction memory 450. The return instruction cache 412 may comprise another small amount of memory internal to instruction fetch unit 410 for storing return instruction words (e.g. instruction words following a return from a sub-routine and/or an ISR call). The pre-decoder 413 may comprise logic circuits for pre-decoding instructions in the instruction pre-fetch buffer 411 and/or the return instruction cache 412.

In an embodiment, the instruction pre-fetch buffer 411 and the return instruction cache 412 may be two separate internal caches. CPU 400 may preserve pre-fetched instruction words when decoding a call instruction. For example, a program (e.g. program 310) comprising a call instruction to a sub-routine (e.g. sub-routine 320) may be stored in instruction memory 450. When the pre-decoder 413 decodes a call instruction in the instruction pre-fetch buffer 411, the next N instruction words following the call instruction may already be fetched and stored in the instruction pre-fetch buffer 411, where N may be about four in some CPU architectures. The N fetched instruction words or some of the N fetched instruction words (e.g. at least one instruction) in the instruction pre-fetch buffer 411 may be preserved instead of discarded. In addition, CPU 400 may save the memory address following the call instruction to track the memory location for execution after returning from the sub-routine call. For example, the pre-decoder 413 may initiate the copy of the N fetched instruction words from the instruction pre-fetch buffer 411 to the return instruction cache 412. Thus, upon completing the execution of the sub-routine, the decode unit 420 and execution control unit 430 may decode and execute the N instruction words preserved in the return instruction cache 412, respectively. When the first instruction of the N preserved instruction words is executed, the instruction fetch unit 410 may retrieve the return address from the return address register and start to fetch instruction words from instruction memory 450 starting at the $(N-1)^{th}$ memory location (e.g. return address+N) following the call instruction concurrently. As such, the CPU discontinuity penalty from a calling operation may be reduced to about zero cycle, thus improving CPU performance and reducing system energy consumption. It should be noted that when the pre-decoder 413 is absence, the decode unit 420 may alternatively initiate the copying of the pre-fetched N instruction words upon the decoding of a call instruction.

In an alternative embodiment, the return instruction cache 412 may be configured as a portion of the instruction pre-fetch buffer 411, where the portion of the return instruction cache 412 may be preserved until a return from a sub-routine call. In such embodiment, the existing lines in the instruction pre-fetch buffer 411 may be reused as cache.

In yet another embodiment, the N instruction words may be preserved at the current position of the instruction pre-fetch buffer 411 and normal fetch operations may be excluded from the portion of the instruction pre-fetch buffer 411 where the N instruction words are stored. Thus, the copying of the N fetched instruction words may not be required. It should be noted that the instruction fetch unit 410 may employ the return instruction cache 412 in substantially similar mechanisms when processing an ISR call. In addition, the instruction fetch unit 410 and the return instruction cache 412 may be configured to support nested sub-routine calls, which may be discussed more fully below.

Figure 5:
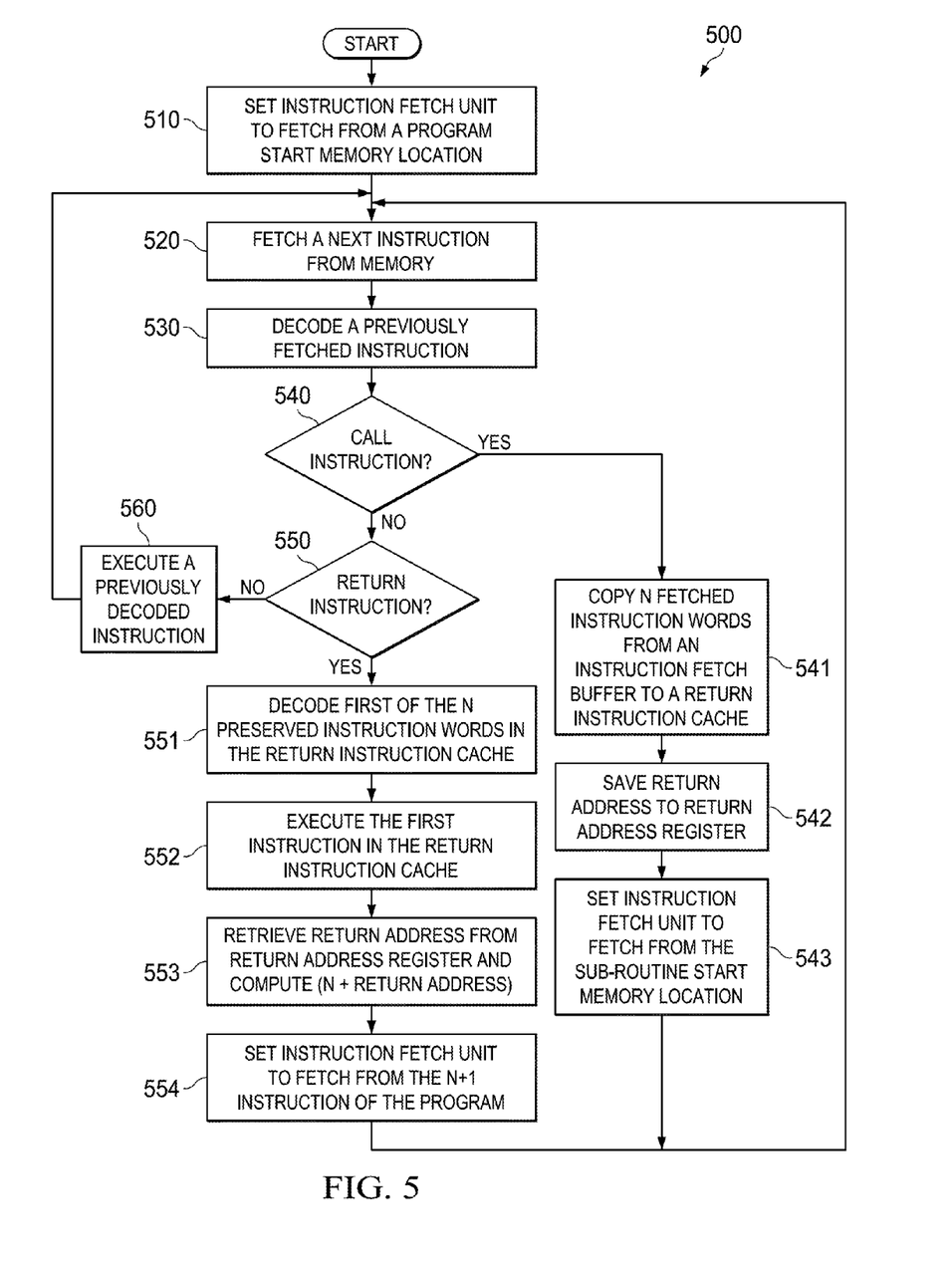
FIG. 5 shows a flowchart of a method for executing a program comprising a sub-routine call in accordance with various embodiments.

FIG. 5 shows a flowchart of a method 500 for executing a program comprising a sub-routine call in accordance with various embodiments. Method 500 may be implemented in a CPU (e.g. CPU 400) comprising a return instruction cache (e.g. return instruction cache 412) and a return address register. Method 500 may be described in the context of a sub-routine call, but may be applied to an ISR call in a substantially similar approach. Method 500 may begin with setting instruction fetch to fetch from a program start memory location as shown in step 510. At step 520, method 500 may fetch a next instruction from the memory and store the instruction in an instruction pre-fetch buffer (e.g. instruction pre-fetch buffer 411). At step 530, method 500 may decode a previously fetched instruction in the instruction pre-fetch buffer.

At step 540, method 500 may determine if the decoded instruction is a call instruction to a sub-routine. If the decoded instruction is a call instruction, method 500 may proceed to step 541. At this time, the N instruction words following the call instruction may already be fetched and stored in the instruction pre-fetch buffer. At step 541, method 500 may copy the N instruction words from the instruction pre-fetch buffer to the return instruction cache for decoding and execution on return from the sub-routine. At step 542, method 500 may save the memory address following the call instruction (e.g. return address) to a return address register. At step 543, method 500 may set instruction fetch to fetch from a sub-routine start memory location. Method 500 may then proceed to step 520 to fetch, decode, and execute instructions of the sub-routine. It should be noted that the copying operation at step 541 may not be required if the return instruction cache is configured as a portion of the instruction pre-fetch buffer, but rather the instruction fetch logic may be reconfigured accordingly instead. In addition, steps 541-543 may illustrate the operations upon decoding a call instruction and the order of operations may vary and may alternatively be performed concurrently.

If the decoded instruction is not a call instruction, method 500 may proceed to step 550 to determine if the decoded instruction is a return instruction (e.g. returning from a sub-routine). If the decoded instruction is a return instruction, method 500 may proceed to step 551. At step 551, method 500 may decode the first preserved instruction in the return instruction cache. At step 552, method 500 may execute the first preserved instruction. At step 553, method 500 may retrieve the return address from the return address register and compute the memory address for the $(N+1)^{th}$ instruction word following the call instruction by adding N to the retrieved returned address. At step 554, method 500 may set the instruction fetch to fetch instruction word at the $(N-1)^{th}$ memory location following the call instruction. Method 500 may then proceed to step 520 to continue to fetch, decode, and execute instructions of the program. It should be noted that steps 551-553 may be intended for illustrative purpose, but may alternatively be performed concurrently.

If the decoded instruction is not a return instruction, method 500 may proceed to step 560 to execute a previously decoded instruction. It should be noted that method 500 may describe the steps of a sub-routine call and return, but may not represent the operations in a sequential timeline. For example, a pipelined CPU may concurrently perform the fetching, decoding, and executing of instructions at steps 520, 530, and 560, respectively, which may be performed in a substantially similar mechanism as described in timing diagram 200. In addition, a pipelined CPU may execute the first preserved instruction at step 553 and fetch the $(N+1)^{th}$ instruction words of the program concurrently. Some of the steps in method 500 may not be performed explicitly, such as the settings of instruction fetch unit to a memory location at steps 510, 543, and 554, but may rather be implemented as part of the instruction fetch unit logic as program counter and/or return address registers are updated.

Figure 6:
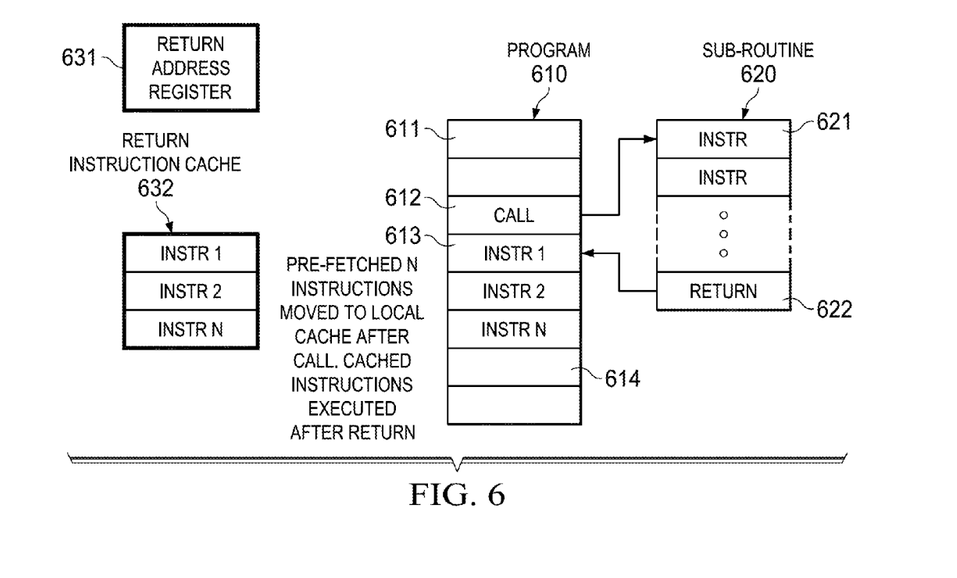
FIG. 6 shows execution of a program comprising a sub-routine call at a CPU comprising an internal return address and instruction cache in accordance with various embodiments.

FIG. 6 shows execution of a program comprising a sub-routine call at a CPU comprising an internal return address and instruction cache in accordance with various embodiments, where the CPU may be substantially similar to CPU 400. In FIG. 6, a program 610 may be stored in a block of memory starting at memory address 611 and a sub-routine 620 may be stored in another block of memory starting at memory address 621, where program 610 and sub-routine 620 may be substantially similar to program 310 and sub-routine 320, respectively. The program 610 may comprise a CALL instruction at memory address 612 to branch to sub-routine 620. When the CPU decodes the CALL instruction, the next N instruction words (e.g. INSTR 1, INSTR2, ..., INSTR N) starting at memory address 613 may already be fetched and stored in an instruction pre-fetch buffer (e.g. instruction pre-fetch buffer 411). Upon decoding of the CALL instruction, the CPU may save the address 613 (e.g. a return address after completing execution of the sub-routine 620) to a return address register 631, and instead of discarding the N fetched instruction words, the CPU may copy the N fetched instruction words from the instruction pre-fetch buffer into the internal return instruction cache 632, which may be substantially similar to return instruction cache 412. After saving the return address and the N fetched instruction words, the CPU may proceed to fetch, decode, and execute sub-routine 620. Upon completing execution of the sub-routine 620 at memory address 622, the CPU may decode and execute the N preserved instruction words in the internal return instruction cache 632 and retrieve the return address from the return address register 631. The CPU may compute the next fetch address (e.g. memory address 614) by adding N to the return address and then return to fetch, decode, and execute the remaining program 610.

Figure 7:
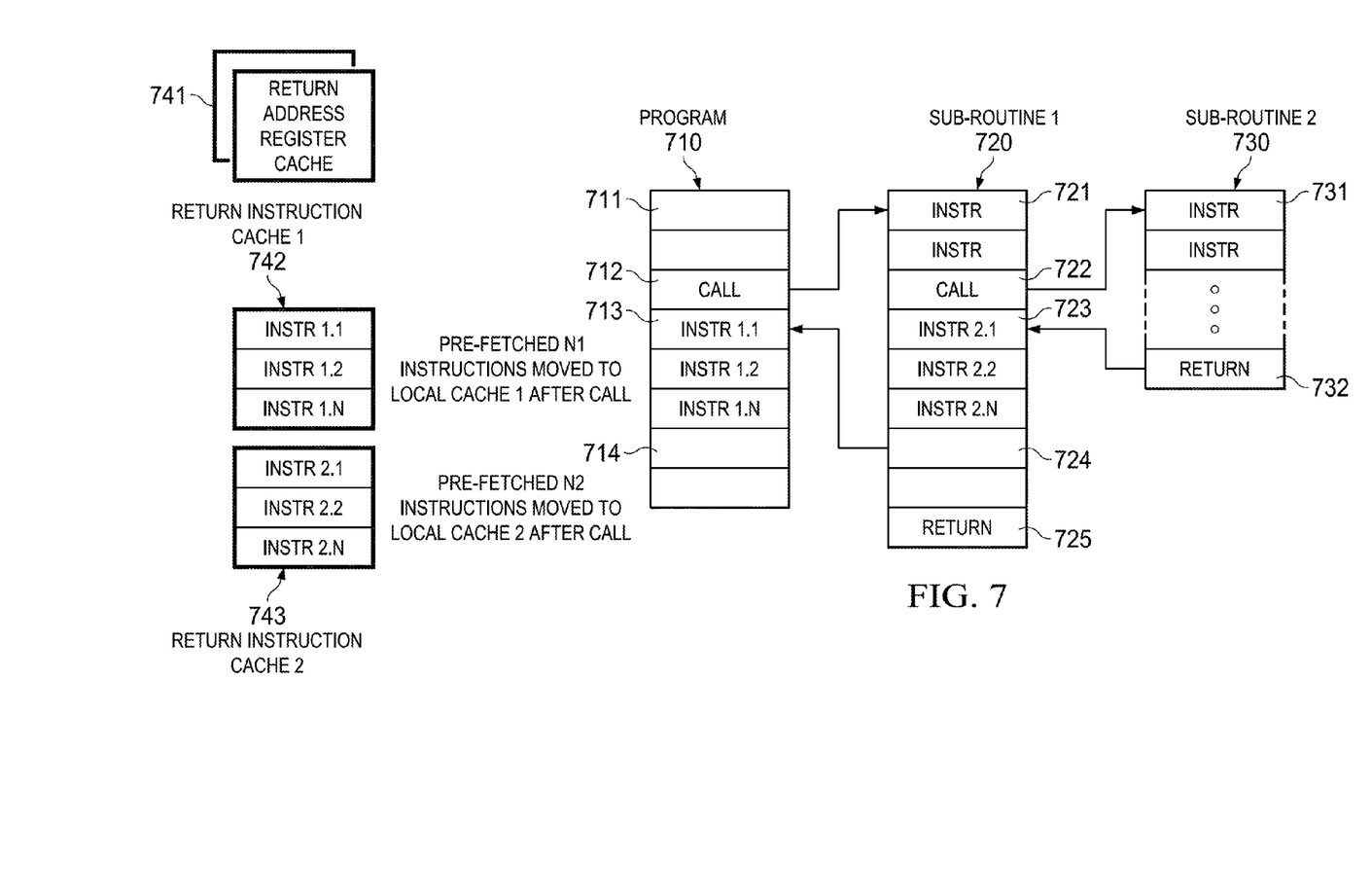
FIG. 7 shows an example of a program execution comprising nested sub-routine calls at a CPU comprising an internal return address and instruction cache in accordance with various embodiments.

FIG. 7 shows an example of a program execution comprising nested sub-routine calls at a CPU comprising an internal return address and instruction cache in accordance with various embodiments, where the CPU may be substantially similar to CPU 400. In FIG. 7, a program 710 may be stored in a block of memory starting at memory address 711 and may comprise a first CALL instruction at memory address 712 to branch to a first level sub-routine 720 stored in another block of memory starting at memory address 721. In addition, the first level sub-routine 720 may comprise a second CALL instruction at memory address 722 to branch to a second level sub-routine 730 stored in yet another block of memory starting at memory address 731. The CPU may support nested sub-routines via an internal cache comprising a plurality of return address register caches 741 and a plurality of return instruction caches 742 and 743. When the CPU decodes the first level CALL instruction, the next N1 instruction words (e.g. INSTR 1.1, INSTR1.2, ..., INSTR 1.N) starting at memory address 713 may already be fetched and stored in an instruction pre-fetch buffer (e.g. instruction pre-fetch buffer 411). The CPU may save the address 713 (e.g. a return address after completing execution of the first level sub-routine 720) to return address registers 741 and copy the N1 fetched instruction words (e.g. INSTR 1.1, INSTR1.2, ..., INSTR 1.N) from the instruction pre-fetch buffer into the first internal return instruction cache 742, which may be substantially similar to return instruction cache 412. The CPU may then proceed to fetch, decode, and execute the first sub-routine 720.

When the second CALL instruction from the first level sub-routine 720 at memory address 722 is decoded, the next N2 instruction words (e.g. INSTR 2.1, INSTR 2.2, ..., INSTR 2.N) starting at memory address 723 may already be fetched and stored in the instruction pre-fetch buffer. It should be noted that N2 may be independent from N1. The CPU may save the address 723 (e.g. a return address after completing execution of the second level sub-routine 730) to the return address registers 741 and copy the N2 fetched instruction words (e.g. INSTR 2.1, INSTR 2.2, ..., INSTR 2.N) from the instruction pre-fetch buffer into the internal return instruction cache 743, which may be substantially similar to return instruction cache 412. The CPU may then proceed to fetch, decode, and execute the second level sub-routine 730. It should be noted that N2 may or may not be equal to N1 as the number of pre-fetched instruction words at the time of a calling operation may vary depending on the program execution history.

Upon completing the execution of the second level sub-routine 730 at memory address 732, the CPU may decode and execute the N2 preserved instruction words from the second internal return instruction cache 743 and continue to fetch, decode, and execute the remaining first level sub-routine 720 at memory address 724.

Upon completing the execution of the first level sub-routine 720 at memory address 725, the CPU may decode and execute the N1 preserved instruction words from the first internal return instruction cache 742 and continue to fetch, decode, and execute the remaining program 710 at memory address 714. It should be noted that the return address registers 741, the first internal return instruction cache 742, and the second internal return instruction cache 743 may be configured as a single internal cache or alternatively separate internal caches. In some embodiments, the internal cache may be configured to support multi-level nested sub-routines by preserving return address and return instructions for each level of sub-routine call when the size of the internal cache permits. In some other embodiments, the size of the internal cache may be limited to a small amount and may cache only one sub-routine level, for example, caching a most recent sub-routine level by overwriting previously cached instruction words.

Thus, the CPU discontinuity penalty for nested sub-routines may or may not be reduced to about zero cycle depending on the number of nested sub-routine levels and the size of the internal cache.

As described above, the disclosed embodiments may reduce CPU performance penalty from discontinuity to about zero cycle, reduce energy penalty from discontinuity by preserving the pre-fetched instruction words, thus reducing system energy and/or power consumption. In addition, the disclosed embodiments may provide more efficient energy and power consumption when compared to a general purpose cache. A general purpose cache may require address comparisons for each instruction fetch cycle to determine if an instruction is already in the cache or if the instruction may be fetched from external memory. Although the number of address comparisons may be reduced depending on the cache architecture (e.g. associativity), the amount of energy and power consumption for the address comparison may be significant. In the hereby disclosed processor comprising an internal return address and instruction cache such energy and power expensive address comparisons may not be required.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   an instruction fetch unit including an instruction pre-fetch buffer, the instruction fetch unit configured to fetch instructions from memory into the instruction pre-fetch buffer; and
   an instruction decode unit coupled to the instruction pre-fetch buffer, the instruction decode unit, upon decoding a call instruction from the instruction pre-fetch buffer, causes next N instruction words of the instruction pre-fetch buffer to be preserved for execution after completing execution of a software module indicated by the call instruction, and causes the instruction fetch unit to begin fetching instructions of the software module from the memory at an address indicated by the call instruction;
   wherein, upon completion of execution of the software module, the instruction decode unit begins to decode the preserved N instruction words while the instruction fetch unit concurrently fetches instruction words from the memory beginning at an address after the N instruction words.

2. The processor of claim 1, wherein the software module is a sub-routine.

3. The processor of claim 1, wherein the software module is an interrupt service routine.

4. The process of claim 1, wherein the preserved N instruction words correspond to at least one instruction.

5. The processor of claim 1, wherein the instruction fetch unit further comprises a return instruction cache, and wherein the next N instruction words of the instruction pre-fetch buffer are preserved in the return instruction cache.

6. The processor of claim 1, wherein the instruction fetch unit is further configured to preserve a location of the instruction pre-fetch buffer where the N instruction words are stored during execution of the software module.

7. The processor of claim 1, wherein the instruction pre-fetch buffer comprises a reserved portion for preserving the next N instruction words.

8. The processor of claim 1 further comprising a return address register, wherein the instruction decode unit, upon decoding the call instruction from the instruction pre-fetch buffer, causes an address of the memory after the call instruction to be saved in the return address register, and wherein upon completion of execution of the software module, the instruction fetch unit retrieves the saved address from the return address register, and computes the address after the N instruction words for fetching based on the saved address.

9. A method, comprising:
   fetching a plurality of instructions from memory into an instruction pre-fetch buffer;
   upon decoding a first call instruction from the instruction pre-fetch buffer, the first call instruction causing a first software module to be executed, preserving next N1 instruction words of the instruction pre-fetch buffer through at least completed execution of the first software module, where N1 is greater than or equal to one;
   fetching, decoding, and executing instructions of the first software module beginning at an address indicated by the first call instruction; and
   upon completion of the first software module, concurrently decoding and executing the preserved N1 instruction words while fetching instruction words from the memory beginning at an address immediately after the N1 instruction words.

10. The method of claim 9, wherein the first software module is a sub-routine.

11. The method of claim 9, wherein the first software module is an interrupt service routine.

12. The method of claim 9, wherein preserving the next N1 instruction words of the instruction pre-fetch buffer comprises copying the next N1 instruction words from the instruction pre-fetch buffer to a return instruction cache.

13. The method of claim 9, wherein preserving the next N1 instruction words of the instruction pre-fetch buffer comprises reserving an area of the next N1 instruction words in the instruction pre-fetch buffer.

14. The method of claim 9 further comprising:
   upon decoding the first call instruction, saving an address of the memory after the first call instruction into a return address register;
   upon completion of the first software module, retrieving the saved address from the return address register; and
   computing the address immediately after the next N1 instruction words based on the retrieved address.

15. The method of claim 9, wherein the first software module comprises a second call instruction, and wherein the method further comprises:
   upon decoding the second call instruction from the instruction pre-fetch buffer, the second call instruction causing a second software module to be executed, preserving next N2 instruction words of the instruction pre-fetch buffer in conjunction with the preserved next N1 instruction words through at least completed execution of the second software module, where N1 and N2 are independent;
   fetching, decoding, and executing instructions of the second software module beginning at an address indicated by the second call instruction; and
   upon completion of the second software module, concurrently decoding and executing the preserved N2 instruction words while fetching instruction words from the memory beginning at an address immediately after the N2 instruction words.

16. The method of claim 9, wherein the software module comprises a second call instruction, and wherein the method further comprises:

upon decoding the second call instruction from the instruction pre-fetch buffer, the second call instruction causing a second software module to be executed, replacing the preserved next N1 instruction words with the next N2 instruction words of the instruction pre-fetch buffer, where N1 and N2 are independent;

fetching, decoding, and executing instructions of the second software module beginning at an address indicated by the second call instruction; and upon completion of the second software module, concurrently decoding and executing the preserved N2 instruction words while fetching instruction words from the memory beginning at an address immediately after the N2 instruction words.

17. The method of claim 9, wherein the first software module is a sub-routine of a multi-level nested sub-routine.

18. A processor, comprising:

an instruction fetch unit, comprising:

a return instruction cache;

an instruction pre-fetch buffer; and a pre-decoder coupled to the instruction pre-fetch buffer and the return instruction cache;

wherein, the instruction fetch unit is configured to fetch instructions from memory into the instruction pre-fetch buffer, and wherein the pre-decoder, upon decoding a call instruction from the instruction pre-fetch buffer, initiates copying of next N instruction words from the instruction pre-fetch buffer into the return instruction cache, where N is an integer value greater than or equal to one, and causes the instruction fetch unit to begin fetching instructions of the software module from the memory at an address indicated by the call instruction;

an instruction decode unit coupled to the instruction pre-fetch buffer and the return instruction cache, wherein the instruction decode unit is configured to decode the fetched instructions; and an instruction execution unit coupled to the instruction decode unit and configured to execute the decoded instructions;

wherein, upon completion of execution of the software module, the instruction decode unit begins to decode the saved N instruction words in the return instruction cache while the instruction fetch unit concurrently fetches instructions from the memory beginning at an address after the N instruction words.

19. The processor of claim 18, wherein the processor further comprises a return address register, wherein the pre-decoder, upon decoding the call instruction from the instruction pre-fetch buffer, causes an address of the memory after the call instruction to be saved in the return address register, and wherein the instruction fetch unit, upon completion of execution of the software module, retrieves the saved address from the return address register, and computes the address after the N instruction words by adding a value of N to the retrieved address.

20. The processor of claim 19, wherein the processor is a pipelined processor.

* * * * *